United States Patent
Baliga et al.

(10) Patent No.: US 7,876,400 B2
(45) Date of Patent: Jan. 25, 2011

(54) OPTICAL MODULATION SYSTEM

(75) Inventors: Roshan B. Baliga, Corvallis, OR (US); Timothy D. Emmerich, Corvallis, OR (US); Peter J. Fricke, Corvallis, OR (US); Richard Aufranc, Albany, OR (US); John A. Devos, Corvallis, OR (US); P. Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1484 days.

(21) Appl. No.: 11/263,523

(22) Filed: Oct. 31, 2005

(65) Prior Publication Data

US 2007/0097478 A1    May 3, 2007

(51) Int. Cl.
*G02F 1/133* (2006.01)
*G02F 1/1347* (2006.01)

(52) U.S. Cl. .............................. 349/74; 349/33; 349/73
(58) Field of Classification Search .................... 349/74, 349/86, 73, 33
See application file for complete search history.

(56) References Cited

U.S. PATENT DOCUMENTS

| | | | |
|---|---|---|---|
| 4,822,144 A | 4/1989 | Vriens | |
| 4,833,542 A | 5/1989 | Hara et al. | |
| 4,882,617 A | 11/1989 | Vriens | |
| 4,980,774 A | 12/1990 | Brody | |
| 5,128,785 A | 7/1992 | Yoshimoto et al. | |
| 5,146,355 A | 9/1992 | Prince et al. | |
| 5,296,954 A | 3/1994 | Ichimura et al. | |
| 5,353,133 A | 10/1994 | Bernkopf | |
| 5,414,545 A | 5/1995 | Lee | |
| 5,490,002 A | 2/1996 | Nicholas | |
| 5,510,915 A | 4/1996 | Ge et al. | |
| 5,523,769 A | 6/1996 | Lauer et al. | |
| 5,563,432 A | 10/1996 | Miura et al. | |
| 5,625,473 A | 4/1997 | Kondo et al. | |
| 5,629,783 A | 5/1997 | Kanbara et al. | |
| 5,666,174 A | 9/1997 | Cupolo, III | |
| 5,715,026 A | 2/1998 | Shannon | |
| 5,717,474 A | 2/1998 | Sarma | |
| 5,726,728 A | 3/1998 | Kondo et al. | |
| 5,729,311 A | 3/1998 | Broer et al. | |
| 5,729,318 A | 3/1998 | Yamada et al. | |
| 5,731,857 A | 3/1998 | Neijzen | |
| 5,751,382 A | 5/1998 | Yamada et al. | |
| 5,751,479 A | 5/1998 | Hamagishi et al. | |
| 5,771,084 A | 6/1998 | Fujimori et al. | |
| 5,784,134 A | 7/1998 | Fugimori et al. | |
| 5,793,456 A | 8/1998 | Broer et al. | |
| 5,805,117 A | 9/1998 | Mazurek et al. | |
| 5,835,174 A * | 11/1998 | Clikeman et al. | 349/86 |
| 5,870,162 A | 2/1999 | Fujimori et al. | |
| 5,872,607 A | 2/1999 | Yazaki et al. | |
| 5,877,735 A | 3/1999 | King et al. | |
| 5,889,614 A | 3/1999 | Cobben et al. | |
| 5,899,551 A | 5/1999 | Neijzen et al. | |
| 5,929,956 A | 7/1999 | Neijzen et al. | |

(Continued)

FOREIGN PATENT DOCUMENTS

EP    412497 A3    8/1990

(Continued)

*Primary Examiner*—David Nelms
*Assistant Examiner*—Nathanael R Briggs

(57) ABSTRACT

Embodiments including a charge responsive optical material are disclosed.

30 Claims, 6 Drawing Sheets

U.S. PATENT DOCUMENTS

| | | | |
|---|---|---|---|
| 5,963,282 A | 10/1999 | Battersby | |
| 6,042,237 A | 3/2000 | De Vaan et al. | |
| 6,057,898 A * | 5/2000 | Itoh et al. | 349/73 |
| 6,130,733 A | 10/2000 | Lowe | |
| 6,218,774 B1 | 4/2001 | Pope | |
| 6,232,937 B1 | 5/2001 | Jacobsen et al. | |
| 6,233,029 B1 | 5/2001 | Iijima et al. | |
| 6,307,604 B1 | 10/2001 | Hikmet et al. | |
| 6,307,605 B1 * | 10/2001 | Bailey | 349/84 |
| 6,320,633 B1 | 11/2001 | Broer et al. | |
| 6,344,887 B1 | 2/2002 | Ma et al. | |
| 6,356,323 B1 * | 3/2002 | Petruchik | 349/74 |
| 6,501,520 B2 | 12/2002 | Nose et al. | |
| 6,501,521 B2 | 12/2002 | Matsushita et al. | |
| 6,507,385 B1 | 1/2003 | Nishiyama et al. | |
| 6,538,814 B2 | 3/2003 | Hunter et al. | |
| 6,618,104 B1 | 9/2003 | Date et al. | |
| 6,654,079 B2 | 11/2003 | Bechtel et al. | |
| 6,757,039 B2 | 6/2004 | Ma | |
| 6,784,953 B2 | 8/2004 | Liang et al. | |
| 6,787,275 B2 | 9/2004 | Kawase | |
| 6,795,138 B2 | 9/2004 | Liang et al. | |
| 6,819,393 B1 | 11/2004 | Date et al. | |
| 6,831,712 B1 | 12/2004 | Stephenson et al. | |
| 6,836,314 B2 | 12/2004 | Date | |
| 6,844,957 B2 | 1/2005 | Matsumoto et al. | |
| 6,909,419 B2 | 6/2005 | Zavracky et al. | |
| 2001/0038426 A1 | 11/2001 | Bechtel et al. | |
| 2002/0036734 A1 | 3/2002 | Ichimura | |
| 2002/0097358 A1 | 7/2002 | Ueki et al. | |
| 2002/0118322 A1 | 8/2002 | Murade | |
| 2002/0126238 A1 | 9/2002 | Matsushita et al. | |
| 2002/0126249 A1 | 9/2002 | Liang et al. | |
| 2003/0007112 A1 | 1/2003 | Matsushita et al. | |
| 2003/0043316 A1 | 3/2003 | Matsumoto et al. | |
| 2003/0142248 A1 | 7/2003 | Park et al. | |
| 2003/0169387 A1 | 9/2003 | Liang et al. | |
| 2003/0218712 A1 | 11/2003 | Kumar | |
| 2003/0231266 A1 | 12/2003 | Ma | |
| 2004/0004765 A1 | 1/2004 | Ihara et al. | |
| 2004/0032561 A1 | 2/2004 | Kumar et al. | |
| 2004/0070702 A1 * | 4/2004 | Meyer et al. | 349/73 |
| 2004/0105048 A1 | 6/2004 | Kyu et al. | |
| 2004/0105057 A1 * | 6/2004 | Tanada et al. | 349/113 |
| 2004/0109107 A1 | 6/2004 | Roes | |
| 2004/0141706 A1 | 7/2004 | Escuti et al. | |
| 2004/0169813 A1 | 9/2004 | Liang et al. | |
| 2004/0257628 A1 | 12/2004 | Mukawa | |
| 2005/0001954 A1 | 1/2005 | Stephenson et al. | |
| 2005/0036077 A1 * | 2/2005 | Khan et al. | 349/36 |
| 2005/0052597 A1 | 3/2005 | Kanou et al. | |
| 2005/0099575 A1 | 5/2005 | Liang | |
| 2005/0122452 A1 | 6/2005 | Yoshida et al. | |

FOREIGN PATENT DOCUMENTS

| | | |
|---|---|---|
| EP | 813251 A3 | 7/1994 |
| EP | 649046 A3 | 10/1994 |
| EP | 637772 A1 | 2/1995 |
| EP | 417852 A2 | 4/1995 |
| EP | 833183 A1 | 9/1997 |
| EP | 856768 A3 | 8/1998 |
| EP | 652461 A1 | 4/2000 |
| EP | 746795 B1 | 9/2000 |
| EP | 649046 B1 | 7/2001 |
| EP | 708931 B1 | 8/2001 |
| EP | 735406 A1 | 12/2001 |
| EP | 1452893 A1 | 5/2003 |
| EP | 1007349 B1 | 9/2004 |
| WO | WO 9101511 A1 | 2/1991 |
| WO | WO 9217814 A1 | 10/1992 |
| WO | WO 9715861 A1 | 10/1995 |
| WO | WO 9531745 A1 | 11/1995 |
| WO | WO 9533224 A1 | 12/1995 |
| WO | WO 9618930 A1 | 6/1996 |
| WO | WO 9619752 A1 | 6/1996 |
| WO | WO 9716765 A1 | 5/1997 |
| WO | WO 9823990 A1 | 6/1998 |
| WO | WO 9823996 A1 | 6/1998 |
| WO | WO 9828658 A1 | 7/1998 |
| WO | WO 9832814 A1 | 7/1998 |
| WO | WO 0007061 A1 | 2/2000 |
| WO | WO 01/07999 A1 | 2/2001 |
| WO | WO 02056097 A2 | 7/2002 |
| WO | WO 2004013746 A3 | 2/2004 |
| WO | WO 2004049044 A2 | 6/2004 |
| WO | WO 2004049051 A1 | 6/2004 |

\* cited by examiner

OPTICAL MODULATION SYSTEM

CROSS-REFERENCE TO RELATED PATENT APPLICATIONS

The present application is related to co-pending U.S. patent application Ser. No. 11/263,525 filed on the same date by Benjamin L. Clark and Sadiz S. Benjgali and entitled "Ultra-Violet Radiation Absorbing Grid", the full disclosure of which is hereby incorporated by reference. The present application is related to co-pending U.S. patent application Ser. No. 11/263,524 filed on the same date by David A. Champion, Charles E. Otis and Chinmay S. Betrabet and entitled "Polymer Dispersed Liquid Crystal", the full disclosure of which is hereby incorporated by reference.

BACKGROUND

Large screens and large displays may be complex and expensive as a result of their size, high voltage electronics and complexity.

DETAILED DESCRIPTION OF THE EXAMPLE EMBODIMENTS

Figure 1:
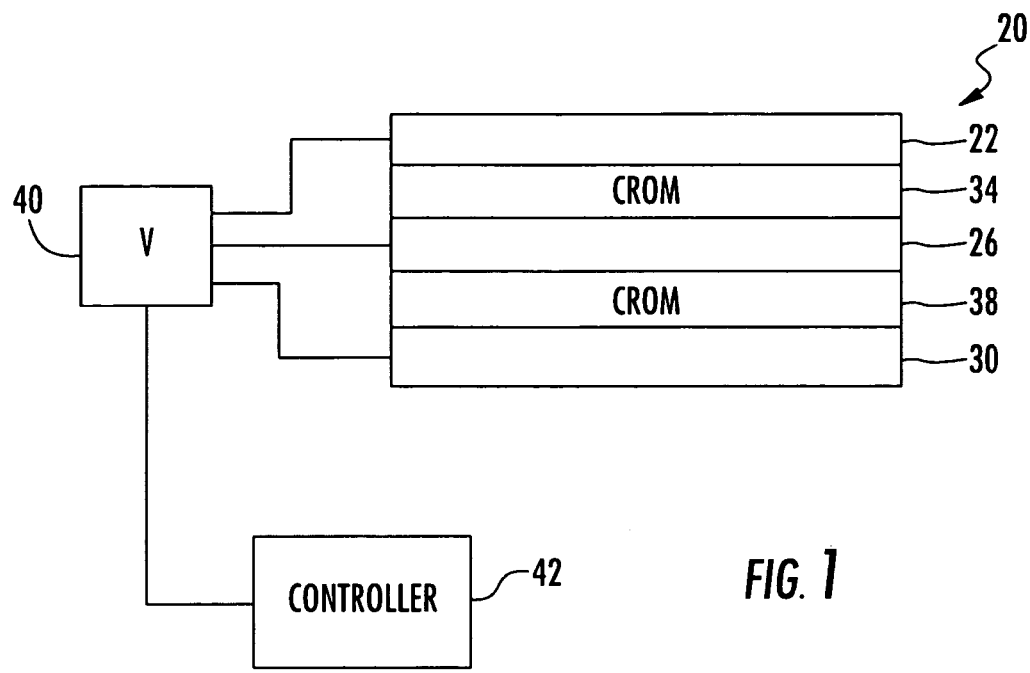
FIG. 1 is a schematic illustration of an example of an optical modulation system according to an example embodiment.

FIG. 1 schematically illustrates one example of an optical modulation system 20 configured to selectively modulate transmission and attenuation of light. For purposes of this disclosure, the term "light" shall include electromagnetic radiation having wave lengths in the ultraviolet, visible and infrared portions of the electromagnetic spectrum. Optical modulation system 20 may be utilized as part of back-lit displays, front-lit displays and projection screens, sometimes referred to as active screens.

Optical modulation system 20 generally includes conductors 22, 26, 30, charge responsive optical material layers 34, 38, voltage source 40 and controller 42. Conductors 22, 26 and 30 constitute plates, layers or other structures configured to conduct electrical charge or current. In one embodiment, each of conductors 22, 26 and 30 is additionally transparent so as to transmit light. In one particular embodiment, layers 22, 26 and 30 may be formed from transparent conductor material such as polyethylene dioxythiopene (PEDOT), indium tin oxide or various other presently available or future developed transparent electrically conductive materials. In still other embodiments, one of conductors 22 and 30 may alternatively be formed from an electrically conductive material that is not transparent.

Conductors 22, 26 and 30 are supported so as to extend on opposite sides of layers 34 and 38. As shown by FIG. 1, layers 22 and 26 sandwich layer 34 therebetween. Layers 26 and 30 sandwich layer 38 therebetween. Layers 22 and 26 cooperate to form an electrical field across layer 34 to control and vary the transmissivity of the charge responsive optical material of layer 34. Likewise, layers 26 and 30 cooperate to form an electric field across the charge responsive optical material of layer 38 to control and vary the light transmissivity or light attenuation of layer 38.

Charge responsive optical material layers 34 and 38 constitute one or more layers of one or more materials configured to change between different states or levels of transmissivity or light attenuation in response to electrical fields applied across such layers. In one embodiment, layers 34 and 38 are configured to change between a first state in which layer 34 and 38 substantially attenuate transmission of all visible light and a second state in which layers 34 and 38 permit light to pass through such layers. In yet another embodiment, charge responsive optical material layers 34 and 38 may alternatively be configured to change between a first state in which layers 34 and 38 substantially attenuate transmission of ultraviolet light or other light and a second state in which layers 34 and 38 substantially permit transmission of ultraviolet light or other light. In one embodiment, layers 34 and 38 may both constitute a polymer dispersed liquid crystal (PDLC).

In one embodiment, layers 34 and 38 may constitute a visible light attenuating PDLC formed from a mixture of a photo activator and a monomer. According to one example embodiment, the photo activator may comprise 10.5 percent by weight MXM035 part A, commercially available from Merck Specialty Chemicals Ltd., Southampton, England. In such an embodiment, the monomer may comprise 89.5 percent by weight MXM035 part B, commercially available from Merck Specialty Chemicals Ltd., Southampton, England. In such an embodiment, this prepolymer is subsequently mixed with liquid crystal such a BL035, commercially available from Merck Specialty Chemicals Ltd., Southampton, England. Upon mixing until homogenous, the mixture is filled into a suitable cell by capillary action and is cured by exposure to ultraviolet light at a wavelength of approximately 350 to 380 nanometers. In one embodiment such curing may be formed at a lamp intensity of between 4 to 14 Watts per $cm^2$ for an exposure time of one to two minutes.

According to another embodiment, in which layers 34 and 38 are configured to actuate or change between a first state in which ultraviolet light is attenuated to a first degree and a second state in which ultraviolet light is attenuated to a second degree, layers 34 and 38 may alternatively include a polymer dispersed liquid crystal having liquid crystal droplets with individual diameters less than or equal to about 800 nanometers and nominally less than or equal to about 500 nanometers. The diameters of the liquid crystal droplets enhances absorption of UV light.

In one embodiment, layers 34 and 38 may constitute a UV light attenuating PDLC formed from a pre-polymer including a mixture of a photo activator and a monomer. According to one example embodiment, the photo activator may comprise 10.5% by weight MXM035 part A, commercially available from Merck Specialty Chemicals Ltd, South Hampton, England. In such an embodiment, the monomer may comprise 89.5% by weight MXM035 part B, commercially available from Merck Specialty Chemicals Ltd., South Hampton, England. According to one embodiment, this pre-polymer is subsequently mixed with liquid crystal to a point of saturation. In one example embodiment, the liquid crystal may comprise BL035, commercially available from Merck Specialty Chemicals Ltd., South Hampton, England. The pre-polymer and the liquid crystal are mixed such that the liquid crystal has a weight percentage of the resulting pre-polymer/liquid crystal mixture of at least about 55%. In one embodiment, the liquid crystal such as BL035, is mixed with the pre-polymer (MXM035 parts A and B) to substantially complete saturation at room temperature (20° C.) of about 60% by weight. In some embodiments, the solubility of the liquid crystal in the pre-polymer is increased to above 60% by weight by additional methods such as by heating the pre-polymer to above 20° C. The resulting mixture is stirred until substantially clear.

Upon completion of preparation of the mixture, the mixture is spread to a thickness of between about 2 micrometers and 20 micrometers. In one embodiment, the mixture of the pre-polymer and liquid crystal is dispensed into a suitable cell by capillary action. The cell may be formed from glass coated with a material such as indium tin oxide, wherein the cell gaps are between 2 microns and 20 microns. Alternatively, the liquid crystal/pre-polymer mixture may be coated onto a substrate such as indium tin oxide coated glass or plastic or other techniques such as bar or doctor blade coating.

Once the liquid crystal/pre-polymer mixture has been spread to a thickness of between 2 microns and about 20 microns, the mixture is subsequently cured by exposing the mixture to ultraviolet light. According to one embodiment, curing is performed under conditions of controlled temperature and UV power. In one embodiment, curing is performed in a range of 22 to 30 degrees C. with a lamp intensity at a substrate of at least about 1.5 W/cm$^2$ and less than or equal to about 5.5 W/cm$^2$ at a UV wavelength of 315 to 400 nanometers for a time of between about 1 and about 3 seconds. According to one embodiment, a post cure at lower lamp power may be performed to provide for full cure. In one embodiment, the process is complete when the mixture is no longer transitioning from a nematic liquid crystal phase to an isotropic liquid crystal phase. Although the example PDLC 24 of layers 34 and 38 has been described as being formed according to the above described process, PDLC of layers 34 and 38 may alternatively be formed using other materials, other mixtures or proportions, other curing rates, and in other fashions.

In one embodiment, coating of the liquid crystal/pre-polymer mixture may be upon an open substrate. In such an embodiment, curing of the mixture is performed in an inert atmosphere to inhibit atmospheric oxygen. A second substrate including conductor 30 and conductor 22 may be subsequently laminated to the film resulting from curing of the mixture.

In still other embodiments layers 34 and 38 may include other charge responsive optical materials. For example, in other embodiments, layers 34 and 38 may alternatively include other liquid crystal compositions. With such compositions, optical modulations system 20 may additionally include polarizer layers.

According to one embodiment, layers 34 and 38 may include a polymer dispersed liquid crystal configured to change between a first substantially white state in which visible light is reflected and diffused and a substantially clear state. In yet another embodiment, layers 34 and 38 may include a PDLC having one or more dyes such that layers 34 and 38 actuate between a dark state, such as black, in which layers 34 and 38 substantially absorb all visible light and a substantially clear transmissive state.

As shown by FIG. 1, layer 34 is sandwiched between conductors 22 and 26 while layer 38 is sandwiched between conductors 26 and 30. Because optical modulation system 20 includes such stacked layers 34 and 38 of charge responsive optical material, individual thicknesses of layers 34 and 38 may be reduced while maintaining the total or collective thickness of charge responsive optical material of system 20. By reducing the thickness of each individual layer 34, 38, conductors 22 and 26 may be closely spaced to one another and conductors 26 and 30 may be spaced more closely to one another. With reduced spacing between conductors 22 and 26 and between conductors 26 and 30, the operating voltages used to actuate or change the charge responsive optical material of layers 34 and 38 between different transmittant states may be reduced while substantially maintaining or reducing by a relatively small amount the responsiveness of layers 34 and 38 when changing between different transmittant states. By maintaining the overall or collective thickness of charge responsive optic material, the ability of system 20 to selectively attenuate light is also maintained or reduced by a relatively small amount as compared to a system including a single layer of charge responsive optical material having the same thickness.

According to one example embodiment in which layers 34 and 38 include a PDLC, layers 34 and 38 each have a thickness of less than or equal to about 5 microns. In such an embodiment, layers 34 and 38 have a thickness of at least about 2 microns. In other embodiments, layers 34 and 38 may be formed from other materials or may have greater thicknesses or reduced thicknesses. Although system 20 is illustrated as including two layers of charge responsive optical materials sandwiched or interleaved between three conductors layers 22, 26, 30, in other embodiments, optical modulation system 20 may alternatively include greater than two layers of charge responsive optical materials sandwiched between greater than three conductors.

Voltage source 40 constitutes a source of electrical charge for two or more of conductors 22, 26 and 30. In one embodiment in which charge responsive optical material layers 34 and 38 include a PDLC, voltage source 40 is configured to provide a time varying voltage to result in an alternating current or charge. In other embodiments, voltage source 40 may be configured to supply a direct current. Voltage source 40 selectively supplies charge to conductors 22, 26 and 30 in response to control signals from a controller 42.

Controller 42 constitutes one or more processor units configured to generate control signals for directing voltage source 40 to supply electrical charge to one or more of conductors 22, 26 and 30. For purposes of the disclosure, the term "processor unit" shall include a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 42 is not limited to any specific combination of hardware circuitry and software, nor to any particular source for the instructions executed by the processing unit.

According to one embodiment, controller 42 is configured to generate control signals such that no voltage is applied to conductor 26 such that conductor 26 is at ground while selectively applying a time varying charge to conductors 22 and 30 to selectively vary an alternating electric field applied across layers 34 and 38 so as to vary the degree of light attenuation by layers 34 and 38. In such an embodiment, different alternating charges may be applied to conductors 22 and 30 such that layers 34 and 38 may exhibit different degrees of light attenuation. In yet another embodiment, controller 42 controls signals such that voltage source 40 applies an alternating charge to conductor 26 while conductors 22 and 30 remain at ground. In such an embodiment, layers 34 and 38 exhibits substantially similar degrees of light attenuation. In yet another embodiment, controller 42 may generate control signals directing voltage source 40 to apply alternating charge to each of conductors 22, 26 and 30 to establish appropriate electrical fields across layers 34 and 38 such that layers 34 and 38 exhibit desired levels of light attenuation.

According to yet another embodiment, controller 42 may be configured to generate control signals to operate over the full switching voltage range available (operate digitally) and multiplex intermediate switching voltages by varying phase difference between voltages applied to conductors on opposite sides of an intermediate charge responsive optical material layer. When the alternating voltages applied to such opposite conductors are in phase and of equal or substantially equal magnitude, the net voltage across the charge responsive optical material layer is zero or substantially zero such that the intermediate charge responsive optical material layer may have a greatest degree of light attenuation. In yet another mode of operation, controller 42 may generate control signals such that the voltages or alternating charges applied to opposite conductors are 180 degrees out of phase such that the net resulting voltage across the intermediate charge responsive optical material layer is at a greatest difference achievable for voltage source 40 so as to exhibit the lowest degree of light attenuation. Intermediate or gray scale levels of light attenuation for the charge responsive optical material may be achieved by controller 42 generating control signals such that the alternating charge applied to opposite conductors are out of phase greater than zero degrees and less than 180 degrees. In those embodiments in which the charge responsive optical material constitutes polymer dispersed liquid crystal or other liquid crystal materials that respond to RMS voltage, each phase difference corresponds to a specific gray scale level.

Figure 2A:
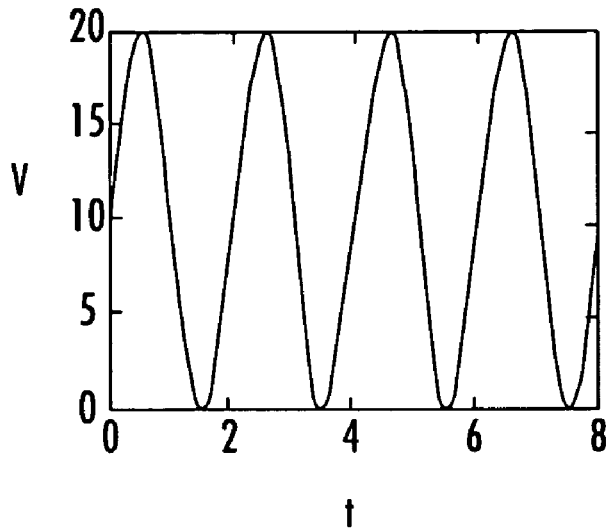
FIGS. 2A-2C are graphs illustrating alternating charge applied to opposite conductors of the system of FIG. 1 and the resulting alternating charge across an intermediate charge responsive optical material layer in one mode of operation according to an example embodiment.
Figure 2B:
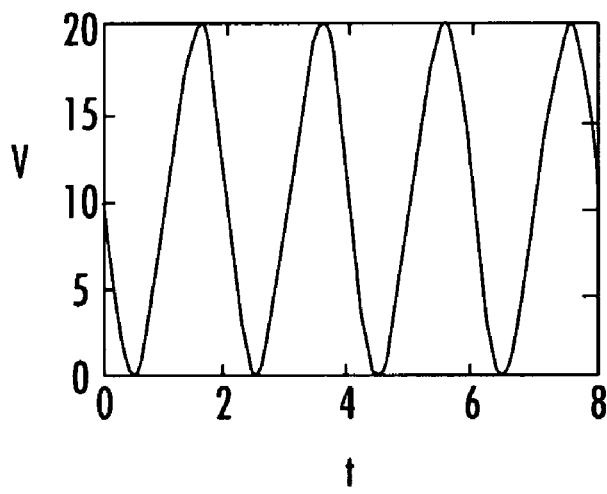
Figure 2C:
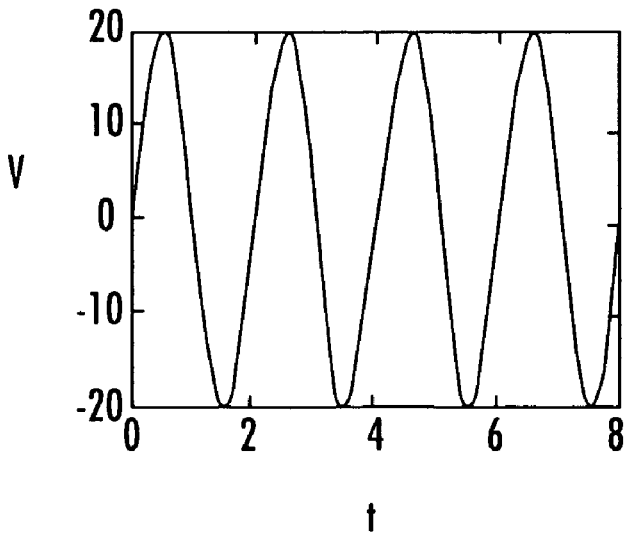
Figure 3A:
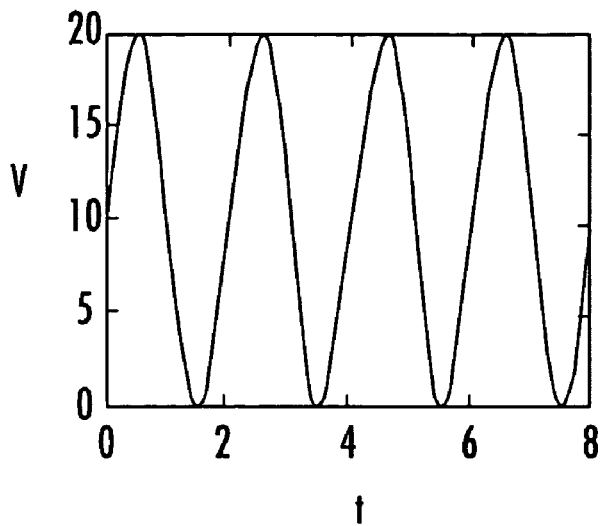
FIGS. 3A-3C are graphs illustrating alternating charge applied to opposite conductors of the system of FIG. 1 and the resulting alternating charge across an intermediate charge responsive optical material layer in another mode of operation according to an example embodiment.
Figure 3B:
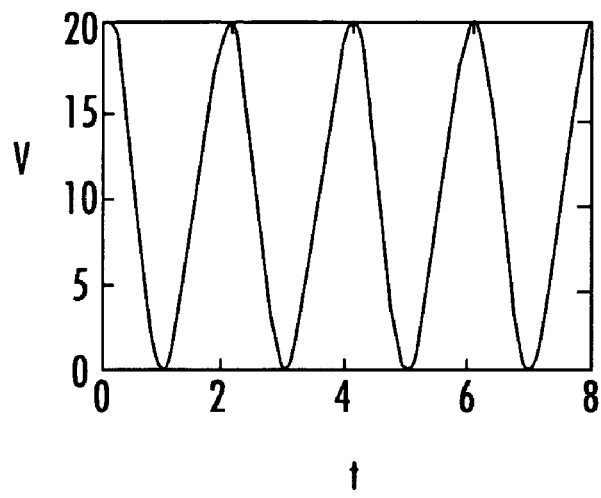
Figure 3C:
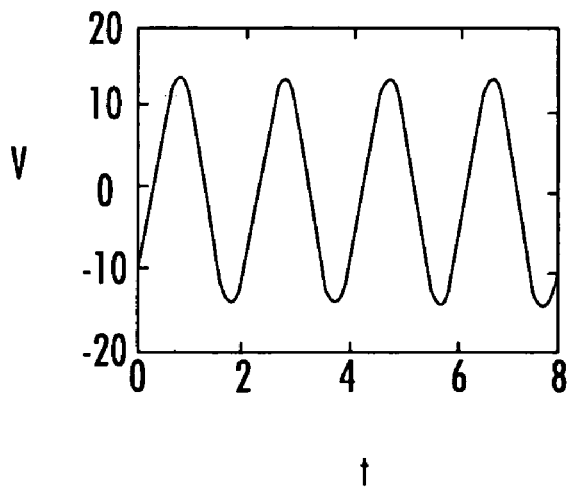
Figure 4A:
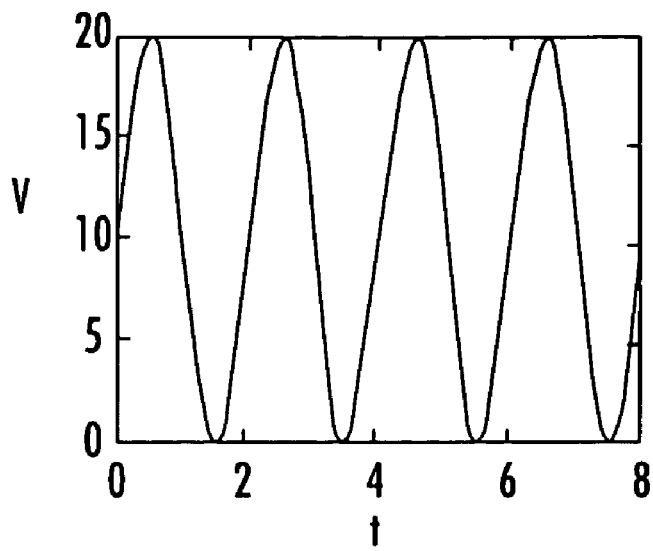
FIGS. 4A-4C are graphs illustrating alternating charge applied to opposite conductors of the system of FIG. 1 and the resulting alternating charge across an intermediate charge responsive optical material layer in another mode of operation according to an example embodiment.
Figure 4B:
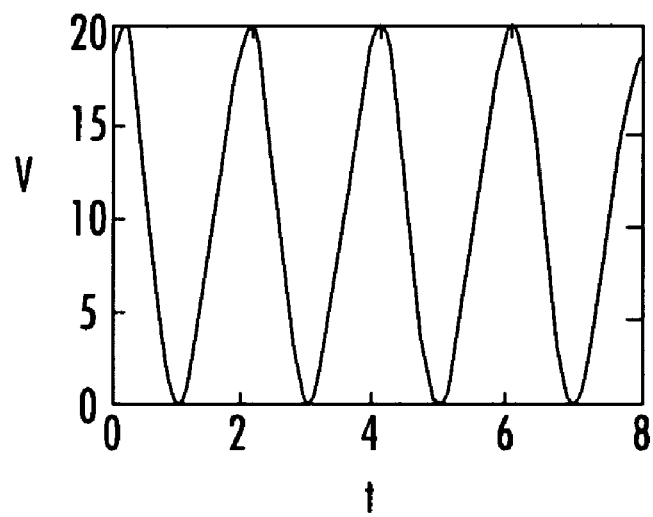
Figure 4C:
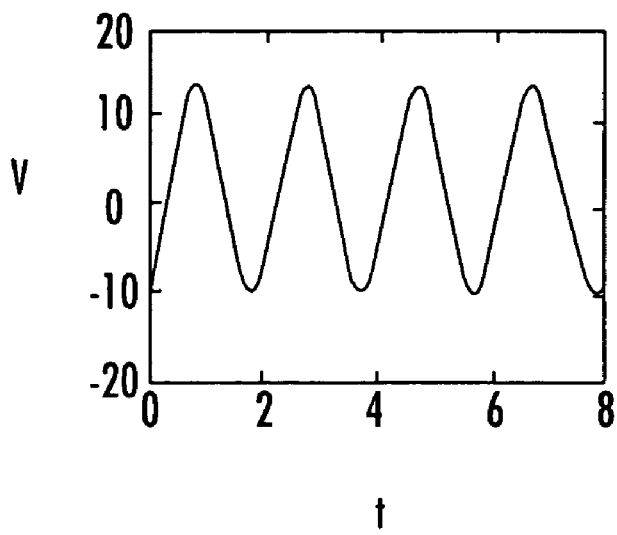

FIGS. 2A-2C, FIGS. 3A-3C and FIGS. 4A-4C illustrate different modes of an example method by which different levels of light attenuation across layer 34 may be achieved by varying phase relationships of alternating voltages applied to conductors 22 and 26. In particular, FIGS. 2A, 3A and 4A illustrate alternating charge or voltage applied to conductor 22. FIGS. 2B, 3B and 4B illustrate alternating charge applied to conductor 26. FIGS. 2C, 3C and 4C illustrate a resultant voltage or field across layer 34. In the example shown in FIGS. 2A-2C, the alternating charge applied to conductor 22 is out of phase with the alternating charge applied to conductor 26 π radians. The electrical field or voltage across layer 34 is the voltage applied to conductor 22 less the voltage applied to conductor 26. In the example shown in which voltage applied to conductor 22 is defined by 10+10 sine ($\pi \times t$) and the voltage applied to conductor 26 is defined by 10+10 sine ($\pi \times t + \pi$), a resultant root mean squared (RMS) voltage across layer 34 is 14.1 volts.

FIG. 3A-3C illustrates another mode in which the alternating charge applied to conductors 22 and 26 has the same frequency but is out of phase by $\pi/2$. In the example illustrated in which the alternating charge applied to conductor 22 is defined as 10+10 sine ($\pi \times t$) and the voltage applied to conductor 26 is defined a 10+10 sine ($\pi \times t + pi/2$), the resultant RMS voltage across layer 34 shown in FIG. 3C is 9.9 volts.

In the mode of operation illustrated in FIGS. 4A-4C, the alternating charge or voltage applied to conductors 22 and 26 is out of phase by $\pi/3$. In one embodiment in which the voltage applied to conductor 22 is defined by 10+10 sine ($\pi \times t$) and the alternating charge of voltage applied to conductor 26 is defined by 10+10 sine ($\pi \times t + \pi/3$), the resulting RMS voltage across layer 34 is 7.07 volts.

As shown by FIGS. 2A-2C, 3A-3C and 4A-4C, controller 42 may generate control signals causing voltage source 40 to vary the phase relationship between the alternating current applied to conductor 22 and conductor 26 so as to control and vary the resultant intermediate RMS voltage across the charge responsive optical material of layer 34 to control and vary the degree of light attenuation provided by layer 34. As a result, additional levels or degrees of light attenuation by layer 34 may be provided for increased levels of gray scale for the screen, display or other device employing optical light modulation system 20. In addition, system 20 and the electronics of system 20 may operate over the full switching voltage range available for the embodiment of the hardware used.

Although the modes of operation illustrated in FIGS. 2A-2C, 3A-3C and 4A-4C have been described with respect to controlling attenuation by layer 34 between conductors 22 and 26, the same general method may alternatively or additionally be applied to control a degree of light attenuation by layer 38 between conductors 26 and 30. Although FIGS. 2A-2C, 3A-3C, and 4A-4C illustrate sinusoidal alternating charge or voltages, in other embodiments, the alternating charge may alternatively have other wave forms or shapes. Although the method described with respect to FIGS. 2A-2C, 3A-3C and 4A-4C is described with respect to optical modulation system 20, the same method may also be employed in other optical modulation systems. For example, the above-described method may also be employed in an optical modulation system having a single layer of charge responsive optical applied to conductor 26 is defined a 10+10 sine ($\pi \times t + pi/2$), the resultant RMS voltage across layer 34 shown in FIG. 3C is 9.9 volts.

In the mode of operation illustrated in FIGS. 4A-4C, the alternating charge or voltage applied to conductors 22 and 26 is out of phase by $\pi/3$. In one embodiment in which the voltage applied to conductor 22 is defined by 10+10 sine ($\pi \times t$) and the alternating charge of voltage applied to conductor 26 is defined by 10+10 sine ($\pi \times t + pi/3$), the resulting RMS voltage across layer 34 is 7.07 volts.

As shown by FIGS. 2A-2C, 3A-3C and 4A-4C, controller 42 may generate control signals causing voltage source 40 to vary the phase relationship between the alternating current applied to conductor 22 and conductor 26 so as to control and vary the resultant intermediate RMS voltage across the charge responsive optical material of layer 34 to control and vary the degree of light attenuation provided by layer 34. As a result, additional levels or degrees of light attenuation by layer 34 may be provided for increased levels of gray scale for the screen, display or other device employing optical light modulation system 20. In addition, system 20 and the electronics of system 20 may operate over the full switching voltage range available for the embodiment of the hardware used.

Although the modes of operation illustrated in FIGS. 2A-2C, 3A-3C and 4A-4C have been described with respect to controlling attenuation by layer 34 between conductors 22 and 26, the same general method may alternatively or additionally be applied to control a degree of light attenuation by layer 38 between conductors 26 and 30. Although FIGS. 2A-2C, 3A-3C, and 4A-4C illustrate sinusoidal alternating charge or voltages, in other embodiments, the alternating charge may alternatively have other wave forms or shapes. Although the method described with respect to FIGS. 2A-2C, 3A-3C and 4A-4C is described with respect to optical modulation system 20, the same method may also be employed in other optical modulation systems. For example, the above-described method may also be employed in an optical modulation system having a single layer of charge responsive optical material disposed between two conductors. Likewise, the method may also be utilized to control light attenuation by more than two layers of charge responsive optical material sandwiched or stacked between more than three conductors.

Figure 5:
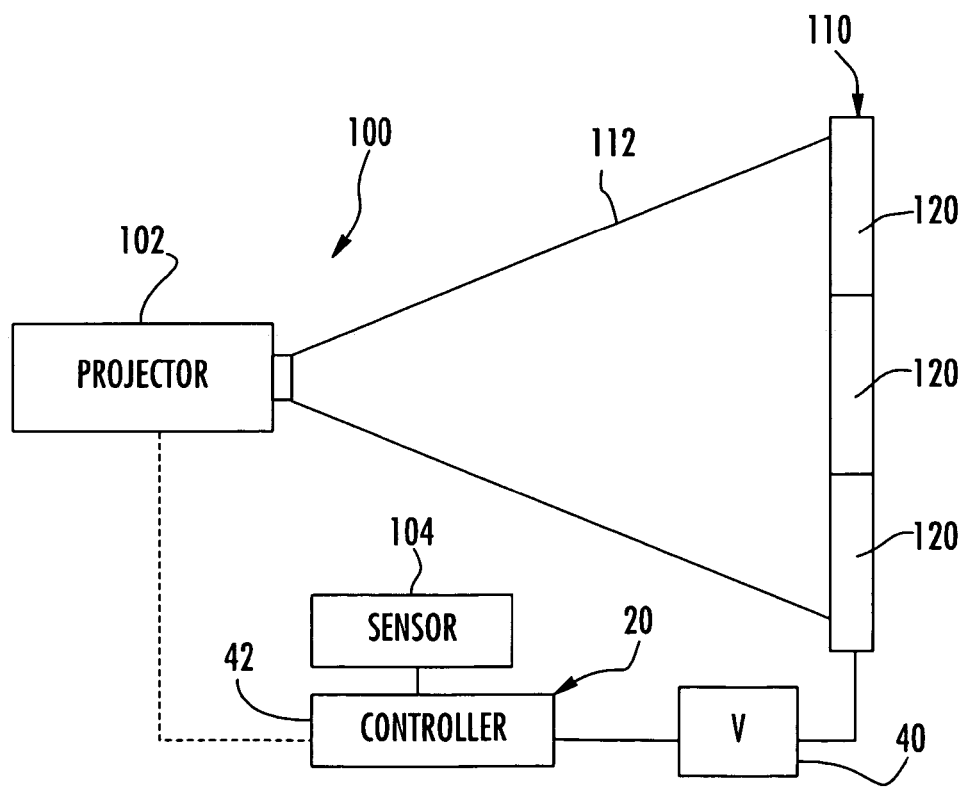
FIG. 5 is a schematic illustration of a projection system including the optical modulation system of FIG. 1 according to an example embodiment.

FIG. 5 schematically illustrates projection system 100, one example of an electronic device including optical light modulation system 20 shown and described with respect to FIG. 1. Projection system 100 generally includes projector 102, sensor 104 and screen 110 which includes at least portions of optical modulation system 20. Projector 102 constitutes a device configured to project visible light 112 upon screen 110 so as to reflect an image from screen 110 that may be viewed by one or more observers. Projector 102 may constitute any one of a variety of presently available or future developed projectors. In one embodiment, projector 102 may be configured to project a color image upon screen 110. In another embodiment, projector 102 may be configured to project a black and white image upon screen 110.

Sensor 104 constitutes one or more devices configured to sense ambient light conditions that may affect viewing of light reflected from screen 110. Sensor 104 is in communication with controller 42 of optical modulation system 20 such that signals corresponding to sensed ambient light levels may be communicated to and used by controller 42. In one embodiment, sensor 104 may constitute one or more sensing devices physically coupled to and associated with screen 110. In yet another embodiment, sensor 104 may constitute one or more sensing devices physically associated with and coupled to projector 102. In still other embodiments, sensor 104 may constitute one or more sensing devices which are physically independent of screen 110 and projector 102. In still other embodiments, sensor 104 may be omitted.

Screen 110 constitutes an active screen configured to provide varying degrees of light absorption and light reflection. In the particular example illustrated, screen 110 is modular, enabling a size of the active area or reflective area of screen 110 to be changed and adjusted as desired.

Figure 6:
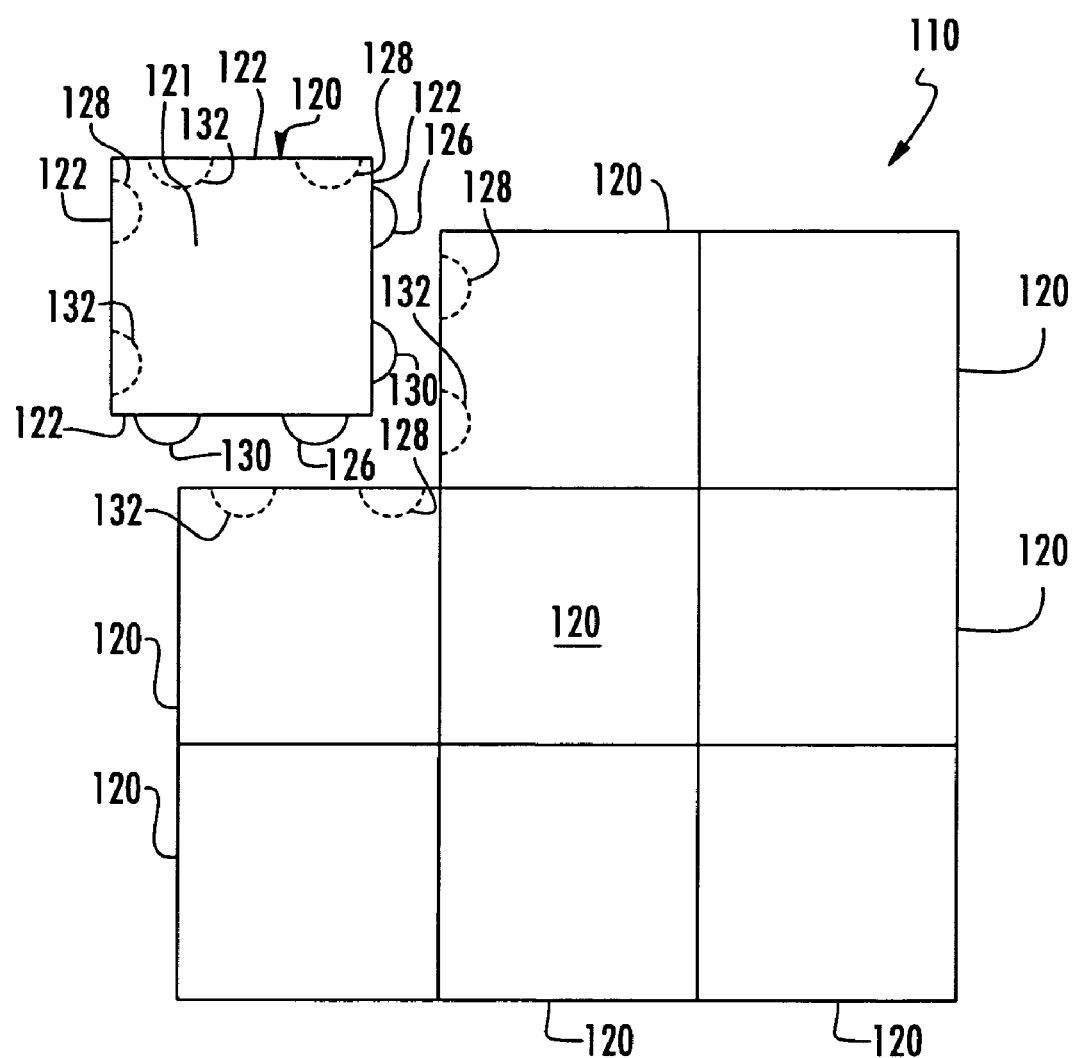
FIG. 6 is front plan view of a screen according to an example embodiment.

FIG. 6 is a front plan view of one example of screen 110. As shown by FIG. 6, in one embodiment, screen 110 includes multiple units 120. Each of units 120 is configured to selectively reflect or absorb visible light. In the particular embodiment illustrated, each of units 120 is configured to selectively reflect or absorb light substantially across its entire face 121. Each unit 120 has side edges 122 configured to be releasably and physically connected to opposite side edges 122 of adjacent units 120 to form screen 110. As a result, units 110 may be added or removed to increase or decrease the overall size of screen 110. Because units 120 include side edges 122 which are configured to releasably connect one unit 120 to adjacent units 120, a substantial majority of the face 121 of each unit 120 may be utilized to reflect or absorb light from projector 102 (shown in FIG. 5). At the same time, because edges 122 are configured to be releasably connected to one another, units 120 may be separated and removed to reduce the area of screen 110. For example, the entire top row of units 120 of screen 110 shown in FIG. 6 may be removed to reduce the height of screen 100. As a result, units 110 facilitate adjusting a size of screen 110 to accommodate different wall sizes and projector to screen distances.

As further shown by FIG. 6, each unit 120 is further configured to be electrically connected to adjacent units 120. In the particular example illustrated, each unit 120 includes power connectors 126, 128 and ground connectors 130, 132, all of which are schematically shown. Power connectors 126 and 128 extend on opposite sides 122 of each unit 120. Power connector 126 is configured to connect to a power connector 128 along an opposite edge 122 of an adjacent 120. In the particular embodiment illustrated, power connector 126 comprises a male connector while power connector 128 comprises a female connector configured to receive connector 126. In other embodiments, this relationship may be reversed.

Ground connectors 130 and 132 extend on opposite sides 122 of each unit 120. Ground connector 130 is configured to be connected to ground connector 132 on opposite side 122 of an adjacent unit 120. In the particular embodiment illustrated, ground connector 130 constitutes a male connector while ground connector 132 constitutes a female connector. In other embodiments, this relationship may be reversed. In one particular embodiment, connectors 126 and 130 are configured to mate with connectors 128 and 132, respectively, so as to also physically connect and releasably retain adjacent units relative to one another while also connecting such units to power or ground, respectively. In other embodiments, separate connectors may be utilized to physically connect units 120 to one another.

As further shown by FIG. 6, each unit 120 includes two adjacent sides 122 having connectors 126 and 130 constituting male connectors and two adjacent sides 122 having connectors 128 and 130 constituting female connectors. As a result, units 120 may be rotated and appropriately positioned such that female connector 128 and 132 are positioned along the outer perimeter of an assembled screen. Consequently, accidental electrical contact of connectors 126 and 130 with other structures may be avoided. In other embodiments, each unit 120 may be provided with greater or fewer number of electrical connections with adjacent modules 120 and such connectors may have other locations or configurations.

Figure 7:
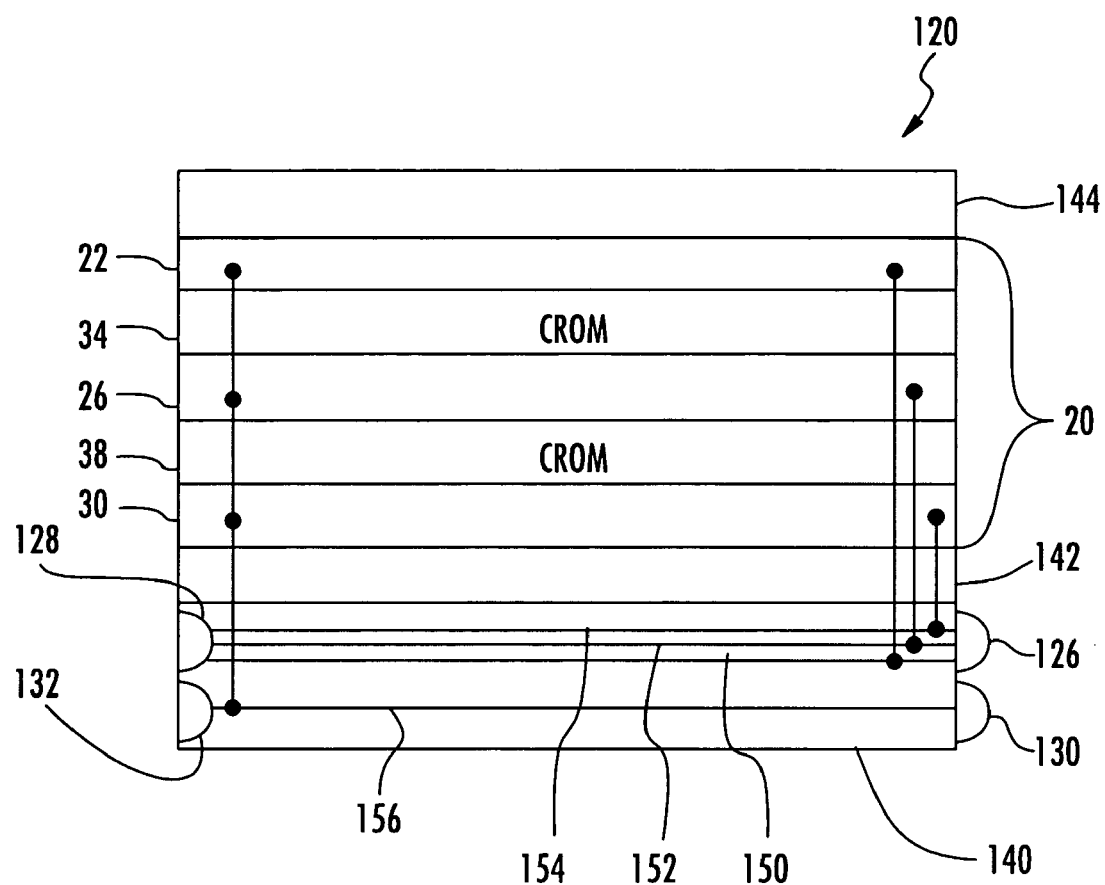
FIG. 7 is a sectional view schematically illustrating one example of a unit of the screen of FIG. 6 according to an example embodiment.

FIG. 7 is a sectional view schematically illustrating one of units 120. As shown by FIG. 7, each unit 120 generally includes connection support 140, optical modulation system 20, opaque layer 142 and cover layer 144. Connection support 140 constitutes one or more layers or structures configured to support connectors 126, 128, 130 and 132 as well as electrical wires or electrically conductive traces extending between connectors 126 and 128 and between connectors 130 and 132. In the particular embodiment illustrated, connection support 140 constitutes a layer of dielectric material on which is disposed electrically conductive traces connecting connectors 126 and 128 and connectors 130 and 132. In such an embodiment, connection support 140 further serves as a substrate for remaining layers of unit 120. In other embodiments, support 140 may alternatively constitute a rigid housing or enclosure enclosing wires, circuit boards and the like while supporting connectors 126, 128, 130 and 132.

Optical modulation system 20 is described above with respect to FIGS. 1-4. As described above, optical modulation system 20 includes conductors 22, 26 and 30, charge responsive optical material layers 34 and 38, voltage source 40 (shown in FIGS. 1 and 5) and controller 42 (shown in FIGS.

1 and 5). As noted above, electric fields created by conductors 22, 26 and 30 across layers 34 and 38 selectively vary light attenuation by layers 34 and 38. As a result, various amounts of light are permitted to pass through layers 34 and 38 and through conductors, 22, 26 and 28 which are transparent. Although unit 120 is illustrated as including an optical modulation system 20 having two charge responsive optical material layers sandwiched or stacked between three conductors, in other embodiments, each unit 120 may alternatively include a single charge responsive optical material layer sandwiched between two opposite conductors or may alternatively include greater than two charge responsive optical material layers sandwiched or interleaved between greater than three conductors.

Although voltage source 40 and controller 42 are schematically illustrated in FIG. 5 as being distinct from screen 110, in other embodiments, controller 42 and/or voltage supply 40 may alternatively be incorporated as part of screen 110. In one particular embodiment, controller 42 and/or voltage source 40 may be supported or housed by connection support 140 of one of units 120 (i.e., a base or central control unit) of screen 110. In still other embodiments, each unit 120 of screen 110 may include controller 42 and/or a voltage source 40 for the particular unit 120. A base unit may communicate with other units via radio frequency (RF) signals or signals imposed on power connections.

Opaque layer 142 constitutes one or more layers of materials substantially opaque to light so as to absorb or alternatively reflect light that has been permitted to pass through optical modulation system 20. In one embodiment, layer 142 may be configured to absorb substantially all visible light passing through layers 34 and 38. For example, in one embodiment, layers 34 and 38 may constitute a PDLC configured to be substantially white in the absence of an electric field so as to reflect and diffuse light in the absence of an applied electric field. In such an embodiment, in the presence of an electric field, light is permitted to pass through layers 34 and 38 so as to be absorbed by layer 142. In such embodiment, layer 142 may be black or colored. As a result, in such an embodiment, each unit 120 of screen 110 (shown in FIG. 6) may be provided with the greater reflective state by reducing or eliminating an electric field applied across one or both of layers 34 and 38.

In another embodiment, layer 142 may alternatively be configured to reflect substantially all visible light. For example, in one embodiment, layer 142 may be white. In such an embodiment, layers 34 and 38 may be formed from a PDLC including a dye such that layers 34 and 38 substantially absorb all visible light in the absence of an applied alternating electric field. In such an embodiment, each unit 120 of screen 110 (shown in FIG. 6) may be provided with a greater reflectivity by increasing the alternating electric field applied across layers 34 and 38, permitting more light to pass through layers 34 and 38 and to be reflected by layer 142.

Although layer 142 is illustrated as being located between support 140 and conductor 30 of optical modulation system 20, in other embodiments, opaque layer 142 may be provided other locations. For example, in another embodiment, layer 142 may alternatively be provided between conductor 30 and layer 38 or as part of conductor 30. In yet another embodiment, which at least portions of support 140 are transparent, layer 142 may be located on the opposite side of support 140 to conductor 30.

Cover layer 144 constitutes one or more layers deposited or otherwise extending over conductor 22 of optical modulation system 20. Layer 144 may be substantially transparent and may be configured so as to protect conductor 22 or so as to further treat light entering and exiting optical modulation system 20. For example, in one embodiment, layer 144 may constitute one or more anti-glare coating layers. In still other embodiments, layer 144 may be omitted.

In operation according to one embodiment, sensor 104 (shown in FIG. 5) senses a level of ambient light and transmits signals to controller 42 based on the sensed ambient light. Controller 42 (shown in FIG. 5) uses the sensed ambient light values to determine a desired level of reflectivity or light absorption for screen 110. Based on the desired level of reflectivity of screen 110, controller 42 determines appropriate level of charge to be applied to one of conductors 22, 26 and 30 such that charge responsive optical material layers 34 and 38 provide desired light attenuation. In one embodiment, controller 42 may consult a memory, such as a look-up table, containing appropriate voltage levels corresponding to sensed ambient light levels. In still another embodiment, controller 42 may calculate such voltage levels based upon sensed ambient light values received from sensor 104. In yet another embodiment in which sensor 104 is omitted, controller 42 may generate control signals causing voltage source 40 to supply alternating charge to one or more of conductors 22, 26 and 30 (depending upon the method by which the electrical field is created across layers 34 and 38) based upon manual or other direct input relating to a desired degree of reflectivity for screen 110 from an observer or other user of projection system 100.

In response to receiving control signals from controller 42, voltage source 40 controls the level of charge applied to one or more of conductors 22, 26 and 30 of each of units 120 through power connectors 126 and 128 and electrical connection lines 150, 152 and 154, respectively. As noted above, in one embodiment, appropriate alternating electrical fields across layers 34 and 38 may be established by (1) applying an alternating charge to conductors 22 and 30 while conductor 26 is grounded; (2) applying an alternating charge to conductor 26 while conductors 22 and 30 are grounded; or (3) applying distinct alternating charges to each conductors 22, 26 and 30; or (4) applying distinct or common alternating charges to each of conductors 22, 26 and 30 and varying the phase relationship between the alternating charges applied to conductors 22 and 26 or 26 and 30. As shown by FIG. 7, each of conductors 22, 26 and 30 of each of units 120 is electrically grounded by ground connectors 130 and 132 and ground connection line 156.

In response to the applied electric field, charge responsive optical material layers 34 and 38 exhibit a desired level of light attenuation. Light 112 from projector 102 (shown in FIG. 5) passes through layer 144, through conductor layers 22, 26 and 30 and through layers 34 and 38 until it impinges layer 142. In one embodiment, such light is reflected from layer 142 back through system 20 and through layer 144 to an observer. In such an embodiment, the light attenuated by layers 34 and 38 is absorbed by layers 34 and 38. In yet another embodiment, light passing through layer 144 and system 20 is substantially absorbed by layer 142, wherein light that is attenuated by layers 34 and 38 is reflected and diffused from layers 34 and 38 back to an observer.

Overall, projection system 100 and screen 110 (shown in FIG. 5) provide several benefits. Because screen 110 is modular, screen 110 (1) permits construction of potentially very large active screens for modular screen building blocks, avoiding an implementation involving fabrication of a large single piece screen, (2) saves on cost, (3) saves on set-up or take-down time as screen 110 may be installed by a single person, (4) facilitates easier transport, (5) enables a size and shape of screen 110 to be changed depending upon wall size or other needs and (6) facilitates repair of damaged or faulty portions of screen 110. Because screen 110 includes optical modulation system 20 having multiple charge responsive optical material layers sandwiched or stacked between conductors, the thickness of the charge responsive optical material layers may be reduced, reducing voltages for changing light attenuation levels of system 20 while increasing responsiveness of the charge responsive optical material layers. Because controller 120 projection system 100 is configured to control or vary light attenuation by layers 34 and 38 by controlling and varying the phase relationship of charge applied to conductors 22 and 26 and/or conductors 26 and 30, multiple levels of gray scale light attenuation may be provided by screen 110, allowing screen 110 and its electronics to operate over a full switching voltage range achievable for the embodiment of the electronics used. Although screen 110 is illustrated (1) as being modular, (2) as including multiple charge responsive optical material layers and (3) as providing light phase-modulated gray scale, in other embodiments, screen 110 and projection system 100 may alternatively utilize fewer than all three beneficial features.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a first conductor;
   a second conductor;
   a third conductor;
   a first charge responsive optical material between the first conductor and the second conductor;
   a second charge responsive optical material between the second conductor and the third conductor; and
   a controller configured to generate control signals, wherein a first alternating current having a first alternating charge is applied to the first conductor and a second alternating current having a second alternating charge out of phase with the first alternating current is applied to the second conductor in response to the control signals.

2. The apparatus of claim 1, wherein the first conductor and the third conductor are transparent.

3. The apparatus of claim 1, wherein the first charge responsive optical material has a thickness of less than or equal to about 5 microns.

4. The apparatus of claim 1, wherein the first charge responsive optical material has a thickness of at least about 2 microns.

5. The apparatus of claim 1, wherein the first charge responsive optical material comprises a polymer dispersed liquid crystal.

6. The apparatus of claim 1, further comprising an opaque layer opposite the second charge responsive optical material.

7. The apparatus of claim 6 wherein the opaque layer is configured to absorb substantially all visible light.

8. The apparatus of claim 6, wherein the opaque layer is configured to substantially reflect all visible light.

9. The apparatus of claim 1 further comprising:
   a first unit comprising:
   the first conductor;
   the second conductor;
   the third conductor;
   the first charge responsive optical material; and
   the second charge responsive optical material; and
   a second unit releasably and physically connected to the first unit along adjacent opposite edges of the first unit and the second unit, the second unit comprising:
   a fourth conductor electrically connected to the first conductor;
   a fifth conductor electrically connected to the second conductor;
   a sixth conductor electrically connected to the third conductor;
   a third charge responsive optical material between the fourth conductor and the fifth conductor; and
   a fourth charge responsive optical material between the fifth conductor and the sixth conductor.

10. The apparatus of claim 9 further comprising a third unit releasably connected to the second unit along adjacent opposite edges of the second unit and the third unit, the third unit comprising:
    a seventh conductor electrically connected to the conductor;
    a eighth conductor electrically connected to the second conductor;
    a ninth conductor electrically connected to the third conductor;
    a fifth charge responsive optical material between the seventh conductor and the eight conductor; and
    a sixth charge responsive optical material between the eighth conductor and the ninth conductor.

11. The apparatus of claim 9 wherein the first unit and the second unit are electrically connected to one another along adjacent opposite edges.

12. The apparatus of claim 9 further comprising a controller configured to generate control signals, wherein the first unit and the second unit modulate light substantially similarly in response to the control signals.

13. The apparatus of claim 9 further comprising a controller configured to generate control signals, wherein the first unit and the second unit modulate light substantially differently in response to the control signals.

14. The apparatus of claim 9 wherein the first unit has a first edge and a second opposite edge and wherein the first unit is configured to modulate light similarly across the first unit from the first edge to the second edge.

15. The apparatus of claim 1 wherein a phase relationship of the first alternating current and the second alternating current is varied in response to the control signals.

16. The apparatus of claim 1, wherein the controller is configured to generate control signals such that the first alternating current having the first alternating charge applied to the first conductor and the second alternating current having the second alternating charge applied to the second conductor are substantially 180 degrees out of phase with respect to one another.

17. An apparatus comprising:
    a first conductor;
    a second conductor;
    a third conductor;

a first charge responsive optical material between the first conductor and the second conductor;

a second charge responsive optical material between the second conductor and the third conductor; and a controller configured to generate control signals, wherein a first alternating current having a first alternating charge is applied to the first conductor and a second alternating current having a second alternating charge out of phase with the first alternating current is applied to the second conductor in response to the control signals and wherein a phase relationship of the first alternating current and the second alternating current is varied in response to the control signals.

18. An apparatus comprising:

a first unit comprising:

a first conductor;

a second conductor;

a third conductor;

a first charge responsive optical material between the first conductor and the second conductor;

a second charge responsive optical material between the second conductor and the third conductor; and a second unit releasably and physically connected to the first unit along adjacent opposite edges of the first unit and the second unit, the second unit comprising:

a fourth conductor electrically connected to the first conductor;

a fifth conductor electrically connected to the second conductor;

a sixth conductor electrically connected to the third conductor;

a third charge responsive optical material between the fourth conductor and the fifth conductor; and a fourth charge responsive optical material between the fifth conductor and the sixth conductor, wherein the first unit and the second unit each include two adjacent sides having male electrical connectors and two adjacent sides having female electrical connectors.

19. The apparatus of claim 18 further comprising a third unit releasably connected to the second unit along adjacent opposite edges of the second unit and the third unit, the third unit comprising:

a seventh conductor electrically connected to the first conductor;

a eighth conductor electrically connected to the second conductor;

a ninth conductor electrically connected to the third conductor;

a fifth charge responsive optical material between the seventh conductor and the eight conductor; and a sixth charge responsive optical material between the eighth conductor and the ninth conductor.

20. The apparatus of claim 18 wherein the first unit and the second unit are electrically connected to one another along adjacent opposite edges.

21. The apparatus of claim 18 further comprising a controller configured to generate control signals, wherein the first unit and the second unit modulate light substantially similarly in response to the control signals.

22. The apparatus of claim 18 further comprising a controller configured to generate control signals, wherein the first unit and the second unit modulate light substantially differently in response to the control signals.

23. The apparatus of claim 18 wherein the first unit has a first edge and a second opposite edge and wherein the first unit is configured to modulate light similarly across the first unit from the first edge to the second edge.

24. The apparatus of claim 18, wherein the second unit may be removed from the first unit to reduce a dimension of the apparatus and wherein the first unit is operable when disconnected from the second unit.

25. The apparatus of claim 18, wherein the first charge responsive optical material, the second charge responsive optical material, the third charge responsive optical material and the fourth charge responsive optical material all change between first identical light interacting states and second identical light interacting states.

26. The apparatus of claim 18, wherein the first charge responsive optical material and the third charge responsive optical material are each configured to change between a first substantially white state in which visible light is reflected and diffused and a substantially clear state.

27. The apparatus of claim 1, wherein the first alternating current comprise a first waveform and the second alternating current comprises a second waveform.

28. The apparatus of claim 1, wherein the first alternating current comprises a first sinusoidal waveform and the second alternating current comprises a second sinusoidal waveform.

29. The apparatus of claim 1, wherein the first alternating current and the second alternating current are out of phase greater than 0 degrees and less than 180 degrees.

30. The apparatus of claim 17, wherein the first alternating current and the second alternating current are out of phase greater than 0 degrees and less than 180 degrees.

* * * * *

UNITED STATES PATENT AND TRADEMARK OFFICE
CERTIFICATE OF CORRECTION

| | |
|---|---|
| PATENT NO. | : 7,876,400 B2 |
| APPLICATION NO. | : 11/263523 |
| DATED | : January 25, 2011 |
| INVENTOR(S) | : Roshan B. Baliga et al. |

Page 1 of 1

It is certified that error appears in the above-identified patent and that said Letters Patent is hereby corrected as shown below:

In column 12, line 29, in Claim 10, after "the" insert -- first --.

Signed and Sealed this
Twenty-seventh Day of March, 2012

David J. Kappos
*Director of the United States Patent and Trademark Office*